US012227399B2

(12) United States Patent
Porma et al.

(10) Patent No.: US 12,227,399 B2
(45) Date of Patent: Feb. 18, 2025

(54) CONTROL OF CHAIN HOIST

(71) Applicant: Konecranes Global Corporation, Hyvinkää (FI)

(72) Inventors: Mikko Porma, Hyvinkää (FI); Tomi Heinonen, Hyvinkää (FI); Ari Väisänen, Hyvinkää (FI)

(73) Assignee: Konecranes Global Corporation, Hyvinkää (FI)

( * ) Notice: Subject to any disclaimer, the term of this patent is extended or adjusted under 35 U.S.C. 154(b) by 0 days.

(21) Appl. No.: 18/561,187

(22) PCT Filed: May 16, 2022

(86) PCT No.: PCT/FI2022/050326
§ 371 (c)(1),
(2) Date: Nov. 15, 2023

(87) PCT Pub. No.: WO2022/243600
PCT Pub. Date: Nov. 24, 2022

(65) Prior Publication Data

US 2024/0253956 A1 Aug. 1, 2024

(30) Foreign Application Priority Data

May 17, 2021 (FI) ..................................... 20215576

(51) Int. Cl.
*B66D 1/48* (2006.01)
*B66D 3/26* (2006.01)

(52) U.S. Cl.
CPC ............... *B66D 1/485* (2013.01); *B66D 3/26* (2013.01)

(58) Field of Classification Search
CPC ................................. B66D 1/485; B66D 3/26
See application file for complete search history.

(56) References Cited

U.S. PATENT DOCUMENTS 5,377,296 A * 12/1994 Greenway ................. B66B 7/06 226/25
8,005,598 B2 * 8/2011 Terashima ............ B66C 13/063 700/55
2005/0110451 A1 * 5/2005 Schroder .................. B66D 3/26 318/611
2014/0124300 A1 * 5/2014 Benosman ................ B66B 7/06 187/247
2014/0151487 A1 * 6/2014 Soper ................... H02G 11/003 242/381.1

FOREIGN PATENT DOCUMENTS

| | | | |
|---|---|---|---|
| EP | 0798488 | A2 | 10/1997 |
| EP | 0903313 | A2 | 3/1999 |
| EP | 1652810 | A1 | 5/2006 |
| FI | 124581 | B | 10/2014 |
| JP | H0630574 | A | 2/1994 |
| JP | H09 060608 | A | 3/1997 |
| JP | H11 343095 | A | 12/1999 |
| JP | 2010 538944 | A | 12/2010 |
| JP | 2012001323 | A | 5/2012 |

* cited by examiner

*Primary Examiner* — Kyle O Logan
(74) *Attorney, Agent, or Firm* — Colson Law Group, PLLC

(57) ABSTRACT

A method comprising: detecting the start of resonance when the chain hoist moves a load, determining a new speed for the rotation of the chain wheel of the chain hoist to avoid resonance, and controlling the chain hoist to use the new speed.

9 Claims, 3 Drawing Sheets

CONTROL OF CHAIN HOIST

TECHNICAL FIELD

The invention relates to a chain hoist and its control.

BACKGROUND

A chain hoist is an example of a device which may lift loads of various sizes. The chain hoist may be designed e.g. for industrial use or it may be designed for use in the entertainment industry for e.g. realising a stage production. When a load is attached to the device, e.g. by means of the chain of the device, it is important that the load may be lifted and lowered safely. For this reason, it is advantageous that the load does not swing or bounce freely supported by the hanging chain but remains as steady as possible during the lifting and the lowering.

The chain hoist may comprise a chain wheel, which may be rotated by an electric motor, and the chain wheel pulls the chain, wherein the load attached to the chain may be lifted and lowered. The chain comprises links, via which, it is possible to convey force in the longitudinal direction of the chain. The chain links may comprise alternating links attaching to each other, either vertically or horizontally and, following the contact surfaces of the alternating links, recesses in the chain wheel are shaped to correspond them. Due to the recesses, an effective diameter of the chain wheel varies, and variable speed is applied to the chain in a pulsating way when the chain wheel rotates e.g. at constant angular speed. The regularly alternating speed in the motion of the chain is also visible as the alternating force of the chain. Due to this, the run of the chain may be pulsating, which may result in resonance in the chain. When strong, the resonance causes vibration in the chain hoist, which vibration may transfer to the supporting structures and may also cause risk situations in the actual lifting event.

BRIEF DESCRIPTION

An apparatus comprising a chain, a chain wheel, a motor, and a control unit, wherein the device additionally comprises means for determining the start of resonance when the chain hoist moves a load, means for determining a new speed for the rotation of the chain wheel of the chain hoist to avoid resonance, and means for controlling the chain hoist to use the new speed.

A chain hoist comprising means for determining the start of resonance when the chain hoist moves a load, means for determining a new speed for the rotation of the chain wheel of the chain hoist to avoid resonance, and means for controlling the chain hoist to use the new speed.

A method for controlling a chain hoist, the method comprising: determining the start of resonance when the chain hoist moves a load, determining a new speed for the rotation of the chain wheel of the chain hoist to avoid resonance, and controlling the chain hoist to use the new speed.

DETAILED DESCRIPTION

A device, which may lift loads, may be e.g. a chain hoist. The chain hoist may comprise a chain, means which enable gripping the load and which are attached at the end of the chain, a chain wheel, a motor, and a brake. Some example embodiments may also include a transmission and a control unit which is able to control the motor. The control unit may also refer to a logical unit and its implementation may vary. The control unit may contain e.g. a variable-frequency drive. Additionally, the chain hoist may have a user interface, by means of which, the operation of the chain hoist may be controlled by its operator. In some example embodiments, the user interface may also exist in a separate device which is connected to the chain hoist by a wired or a wireless connection.

The chain hoist may be used in some examples such that the chain hoist is a part of a hoisting system which may comprise, in addition to the chain hoist, e.g. an overhead travelling crane, a light hoisting system or a swinging boom crane.

Figure 1A:
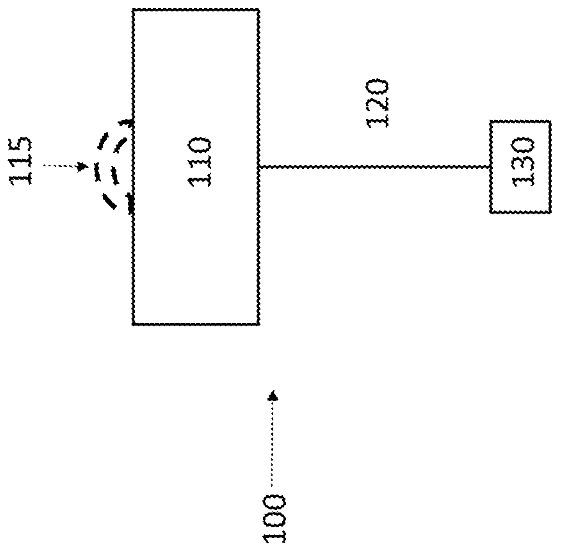
FIGS. 1*a*, 1*b* and 1*c* show examples of a chain hoist structure.

FIG. 1*a* shows a simplified example of a chain hoist 100. The chain hoist 100 comprises a chain 120 which may be e.g. a link chain or a roller chain. The chain is connected to a gripping means, by means of which, a load 130 may be attached to the chain such that the load hangs from the end of the chain. The gripping means may be one or more attaching mechanisms. For example, a hook may be used as the gripping means.

A housing 110 of the chain hoist comprises a chain wheel to which the chain 120 attaches and by means of which the chain may be moved such that the load is lowered or lifted. The chain wheel may be rotated by means of a motor, that is, the motor is then functionally attached to the chain wheel. The motor may be an electric motor, such as e.g. an adjustable-speed motor. The electric motor may be controlled e.g. by a variable-frequency drive. The housing of the chain hoist may also include a transmission and a brake.

The operation of the chain hoist may be controlled e.g. by a controller coupled to the hoist which controller comprises buttons for controlling the operation of the chain hoist. Using of the buttons, it is possible e.g. lift and lower a load such that the length of the chain may be rolled up shorter or rolled out longer by the chain wheel. This may be performed e.g. by rotating the chain wheel, wherein the load attached to the chain is lifted or lowered and, at the same time, the length of the chain between the chain wheel and the load changes. Furthermore, the chain hoist may comprise a control unit which may control the operation of the hoist, such as e.g. run direction and/or run speed. The chain hoist may also comprise a variable-frequency drive which may be a part of the control unit or it may be in connection with the control unit.

The chain hoist may be attached by means of a bracket 115. In some example embodiments, the attachment may also be done in any other suitable way. The chain hoist may lift loads of various sizes. The load may be, for example, in the weight range of 100-2,500 kg, although it is also possible to lift and lower loads in other weight ranges. At the maximum, the load may be e.g. 5,000 kg or 10,000 kg.

Figure 1B:
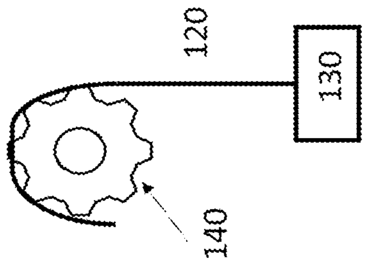

FIG. 1*b* shows a chain wheel 140. The chain wheel 140 is of polygonal shape and it may include teeth, whereby the chain 120 may attach itself around the chain wheel. Then, the free, unloaded end of the chain, which end is not coupled to the load to be lifted, may lower into a chain bag or housing which is not shown in the figure. The rotation of the chain wheel 140, which may then be provided by means of an electric motor, thus brings about the moving of the chain 120 either upwards or downwards, depending on the rotation direction of the chain wheel 120. Hence, the load 130 may be either lifted or lowered.

Because of its polygonal shape, when the chain wheel is rotating, its angular speed remains constant, or essentially constant, but its linear speed varies. This so-called polygon phenomenon causes vibration in the chain 120 and the load 130 attached to it, which together form a spring-mass system. This spring-mass system has a natural vibration frequency which is dependent on both the length of the chain 120 and the mass of the load 130. Because the free length of the chain 120 in the different steps of the lifting and the mass of the load 130 when selecting a hook load may vary, the natural vibration frequency, which may be referred to as characteristic frequency, also varies.

If the natural vibration frequency of the spring-mass system is close to the run frequency, this may cause resonance. This resonance may be harmful because it results in the swinging of the load in a way which is not desired and which may also be dangerous. For example, in difficult vibration phenomena, the use of the chain hoist must be slowed down, the hook load may drop, or the hook load may drop along with the chain hoist. Therefore, it is desirable to be able to prevent the development of such resonance.

The creation of resonance may be avoided in many ways. In some example embodiments, resonance may be decreased by installing a damper in connection with the electric motor, which damper controls the run of the electric motor such that the creation of resonance may be avoided. Such a damper may be e.g. a part of the control unit or, alternatively, be its own unit.

In some example embodiments, the development of resonance may be prevented by by return coupling, wherein the speed is continuously adjusted based on force measurement such that changes in the force caused by the uneven rotation due to a change in the chain speed are minimised. However, this requires a rapid response in order to be able to perform the minimisation effectively. In order to have a rapid response for the return coupling, the apparatus requires more sufficiently effective components, which may increase costs and the size of the required apparatus.

Figure 1C:
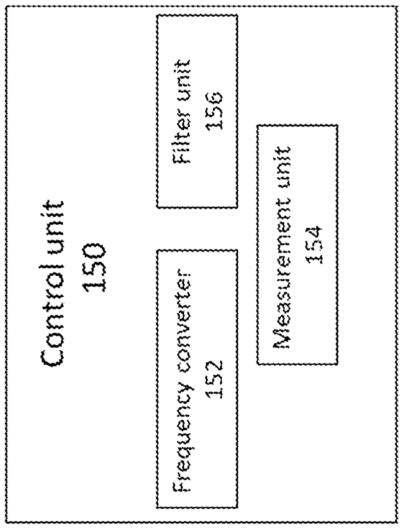

The chain hoist may also comprise a filter unit which may be a separate unit or a part of some other unit, such as e.g. the control unit and/or the variable-frequency drive. FIG. 1*c* illustrates this such that it shows an example of a control unit 150 which includes a variable-frequency drive 152, a measurement unit 154 and a filter unit 156. The filter unit 156 may e.g. perform high-pass filtering such that vibration, which is caused by the chain wheel, may be separated from a force signal $F_L$ which describes a force caused by the load to the chain. In order to receive the force signal $F_L$, it is possible to use any suitable measurement method. The signal describing the vibration obtained from the filter unit 156 may be analysed in the filter unit 156 or some other suitable unit such that it is possible to determine minimum $F_{min}$ and maximum $F_{max}$ of one vibration period from the filtered signal for the part of the force affecting the chain. A difference $F_{PeakToPeak}=F_{max}-F_{min}$ may be calculated from the minimum and the maximum.

The filter unit 156 may measure the minimum and the maximum, for the part of the force affecting the chain, for several different vibration periods, whereby it is possible to observe what kind of development occurs in the differences of the force minimum and maximum during several vibration periods. This observation may be performed e.g. in the filter unit 156 or the control unit 150 and it may be implemented by means of e.g. software and memory and one or more processors. If it is observed that the difference $F_{PeakToPeak}$ starts to increase, it may be deducted that resonance has started. The deduction may be based e.g. on $F_{PeakToPeak}$ having increased more than a predetermined limit value.

In order to avoid the started resonance, the control of the motor is adjusted such that the control unit 150 adjusts instructions on which speed the chain hoist is run by the motor. The control unit 150 may also include a variable-frequency drive 152. The instructions may be adjusted by means of correction term $f_{corr}$ added in the speed instruction. The speed instruction is thus a determination of the speed on which the chain wheel is rotated by means of the motor and, hence, the chain hoist is run. The speed is preferably angular speed. When the resonance is observed to intensify i.e. increase, the speed is adjusted to the negative direction by means of a correction term $f_{corr}$. In other words, the avoidance of resonance may also be understood such that one tries not to damper the vibration totally but, as the resonance increases, the run speed is altered such that, when running upwards, the speed may be e.g. decelerated and, on the other hand when running downwards, the speed may be accelerated. It should be still noticed that the increase in speed must be controlled and it is possible that acceleration means a marginal increase in speed. The avoidance of resonance may thus be understood as totally avoiding the resonance or damping the created resonance. Increasing the speed uncontrollably or too much may cause problems in operation. Furthermore, the chain hoist and its components have a limit speed which may not be exceeded in any situation and, hence, increasing the speed must be controlled within the characteristics of the chain hoist. This way, it is enabled that the change in speed may overcome the resonance. The polygon phenomenon as such is not avoided but the resonance which occurs in each length of the free chain. An advantage obtained by using the correction term $f_{corr}$ added to the speed instruction is that no separate return coupling apparatus is required which would naturally create more delay and which would increase the size of the required apparatus. Additionally, the delay in return coupling weakens the effect of damping. There is no such delay in the change of speed because there the aim is not to dampen single vibration but, instead, the aim is to shift the speed to such a speed range where the chain and the load resonate less. Additionally, by means of the arrangement, the motion of the chain may continue with the altered speed when passing the point of resonance whereby, equivalently, the system status and tendency for vibration simultaneously change due to the change in the free length of the chain. In practice, it may be that the correction term must be negative. It is possible that the correction increasing the speed should not be used for safety reasons.

Like mentioned above, the increase in the resonance may be determined based on e.g. $F_{PeakToPeak}$ having increased more than a predetermined limit value. This limit value may be $F_{on}$, which is a parameterizable limit value, and when it is exceeded, the variable-frequency drive, which may be a part of e.g. the control unit, starts to e.g. integrate in the negative direction. If $F_{PeakToPeak}$ again is below the parameterizable limit value $F_{off}$, the variable-frequency drive starts to e.g. integrate in the positive direction.

The correction term $f_{corr}$ may thus be determined in the following way:

$$F_{PeakToPeak} > F_{on}, f_{corr} = \min(f_{corr} - K_i^{on} \times t_s, f_{maxcorr})$$

$$F_{PeakToPeak} < F_{off}, f_{corr} = \max(f_{corr} + K_i^{off} \times t_s, 0)$$

In the above equations, $K_i^{on}$ ja $K_i^{off}$ are amplifications of the variable-frequency drive, $t_s$ is run period of the program and $f_{maxcorr}$ is maximum correction allowed of the correction term. The run period of the program may be understood as time which describes the point of time when the correction term is in use.

Figure 2:
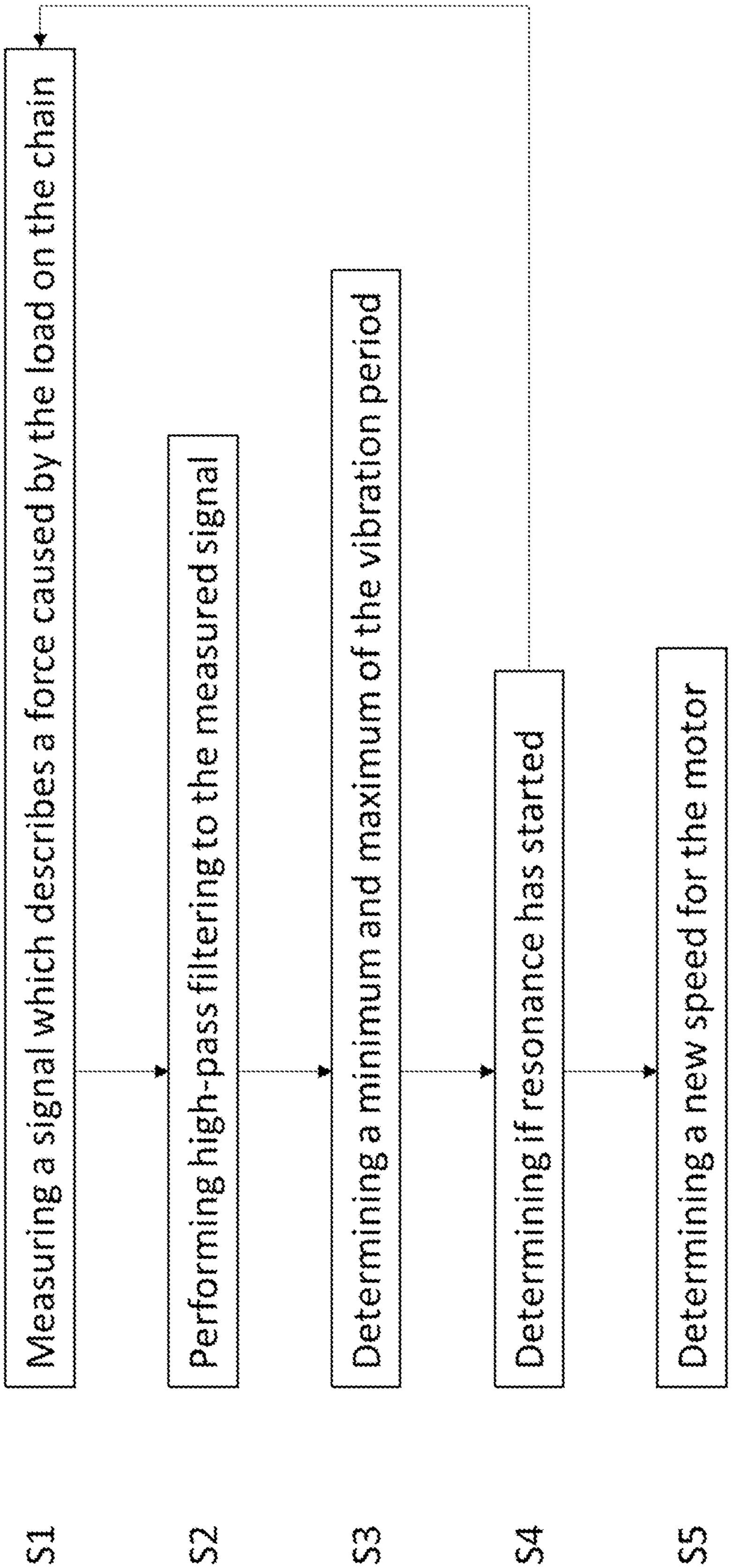
FIG. 2 shows an example embodiment by means of a block diagram.

FIG. 2 shows an example of an embodiment by means of a block diagram. First block S1 of the block diagram shows measuring a signal, which may also be called a force signal, which describes a force caused by the load to the chain. This measurement may be performed utilizing any suitable measurement method. For example, it is possible to use an apparatus which may be a part of the chain hoist or in connection with the chain hoist, and this apparatus may comprise means for performing the measurement. The means for measuring a force are preferably connected to the measurement unit 154. For example, the variable-frequency drive may be an apparatus comprising means for measuring a force. The force may be measured e.g. such that the chain hoist includes a separate force sensor such that the static force of the load hanging in the chain due to gravity is applied to it. The force sensor may also be able to measure dynamic force caused by vibration. Furthermore, the variable-frequency drive may in some example embodiments measure electric loading during the lift from the magnitude of rotative moment controlled on the motor shaft from the electric current of the motor. This loading is proportional to the lifting force. The electric motor is preferably an alternating-current motor.

In block S2, high-pass filtering may be performed to the signal. The high-pass filtering may be performed by any suitable apparatus which may also include program code and means for executing the program code. This apparatus may be a part of some other apparatus and/or a part of the chain hoist. Alternatively, the apparatus may be in connection with the chain hoist. The high-pass filtering may be performed in e.g. the variable-frequency drive. The high-pass filtering is from an example embodiment the aim of which is a method which may substantially cut an equal share of a quantity with different values of a variable.

Block S3 shows determining a minimum and a maximum of the force from the vibration period from the high-pass filtered signal. Based on these, it is determined in block S4 if the resonance has started. These determinations may be done by an apparatus suitable for it and program code. The program code may be stored in a memory and it may be executed by means of one or more processors. The utilized apparatus may be a part of the chain hoist, a part of some other apparatus or connected to another apparatus or chain hoist. The apparatus may comprise e.g. a variable-frequency drive.

If it is determined that resonance has not started, it is possible to move again to block S1 and the detection may be done during a lift or a lowering continuously. If it is detected that resonance has started, it is possible to move to block S5. Block S5 shows determining a run speed for the motor which causes the rotation of the chain wheel of the chain hoist. The determining may be done in the control unit or a separate unit and it may be done, at least partially, by means of program code. If the determining is done in a separate unit, the unit may be a part of the chain hoist or it may be in connection with the chain hoist. The determining may be performed in e.g. the variable-frequency drive.

Figure 3:
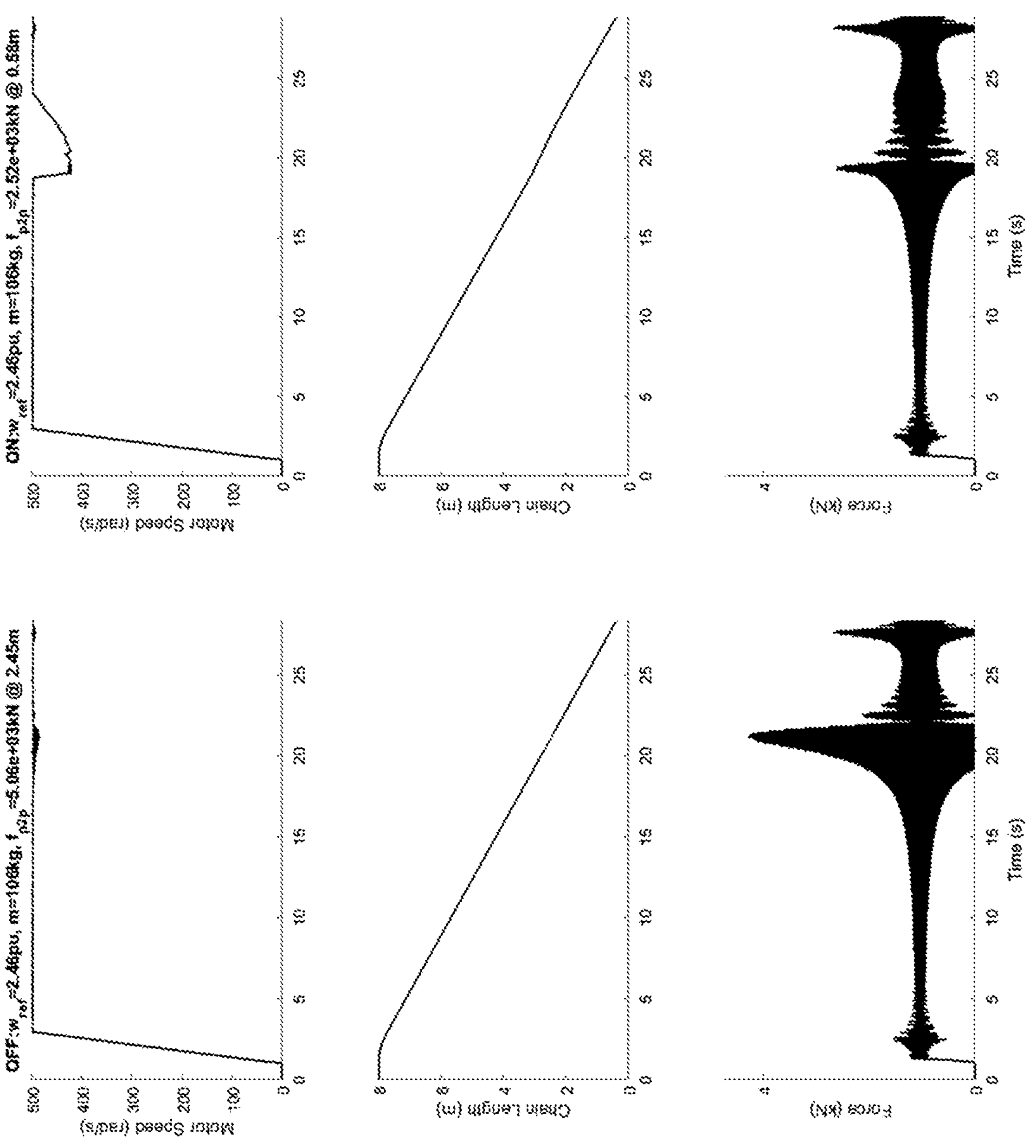
FIG. 3 comprises diagrams 312, 322, 323, 314, 324 and 334 and shows measurement results for the example embodiment.

FIG. 3 illustrates measurement results in accordance with an example embodiment as a function of time between 0-29 seconds, when the chain hoist transfers a load such that the speed is not altered (charts 312, 322, 332, note OFF) and then such that the speed is altered (charts 314, 324, 334, note ON), when the resonance has been determined having started. It should be noticed that, in the measured and shown examples (OFF/ON), a guideline speed wref is the same before detecting the vibration and the load mass m is the same. Chart 312 shows angular speed of the motor in different points of time. As seen in the figure, the speed remains constant or almost constant. Chart 322 shows the chain length in corresponding points of time, when the motor causes the chain wheel to rotate such that the length of the chain shortens and the load is thus lifted. Chart 332 shows how the resonance is created and how it increases at the point of about 20 seconds whereby, in the vibrating system of the chain and the load caused by gravity, the frequency caused by the polygon-shaped chain-shaped chain wheel is sufficiently close to the characteristic frequency of the vibrating system, and the system starts to resonate. This resonance makes the load swing and be unbalanced, which may cause risk situations and is thus unwanted.

Chart 314 again shows the angular speed of the motor in different points of time when its speed is altered as the resonance starts. Chart 324 shows the chain length when the motor causes the chain wheel to rotate such that the length of the chain shortens and the load is thus lifted. Chart 334 shows how resonance starts. As being visible from charts 314 and 334, the angular speed of the motor alters simultaneously or substantially simultaneously as the resonance starts. Chart 324 shows in point of time 18-22 seconds the effect of the decrease in speed as a small change in the angular coefficient. When equivalently in chart 314 the speed has decreased from level 500 to level 400, which equals a change of about −20%, no very considerable change has occurred in the run of the lift of the chain hoist. The change does not weaken the lifting capacity significantly, even though vibration significantly decreases. Hence, the minimum and maximum points of vibration remain more moderate than when the speed in not altered as the resonance starts. In charts 312, 322 and 332, the OFF conditions are described by the following values: lifting speed wref=2.46 pu, load mass m=106 kg, maximum force fp2p during vibration=5060 N, when the load is at height 2.45 m from the ground. Equivalently in charts 314, 324 and 334, the OFF conditions are described by the following values: lifting speed wref=2.46 pu, load mass m=106 kg, maximum force fp2p during vibration=2520 N, when the load is at height 0.58 m from the ground. In these example embodiments, the halving of the maximum force of vibration has been achieved. Additionally, the length of the vibrating chain was shifted in the maximum vibration to a different point of the length, which also shows the good functionality of the example embodiments. The predetermined limit value was selected in this example such that, the difference of the force maximum and minimum being below 2,520 N, the adjustment does not activate. Naturally, setting different parameters to the adjustment system would be able to create damping even to this quantity of vibration. Furthermore, the highest amplitude of vibration may occur in a different chain length than in the OFF state when utilising the method.

It should also be noticed that, if the spring constant of the spring-mass system formed by the chain and the load is known beforehand, this information may be utilised and, hence, determine the continuously avoidable resonance frequency based on the chain length and the load. In such an example embodiment, it would thus be possible to omit the detection of the start of the resonance based on the difference between the maximum and minimum of force during the vibration period.

In some example embodiments, it is not always possible to know beforehand the spring constant of the spring-mass system formed by the chain and the load. This may be due to e.g. the mass of the load varying in different situations or the mass being unknown or the available chains having differences e.g. in their size and/or rigidity. Additionally, the chain may wear in use, which may change its characteristics. If the mass of the load being lifted alters during lifting, which may be quite unusual, the characteristics of the vibration system and the characteristic vibration frequency may change. The mass of the load being lifted may alter e.g. when the load being lifted includes a leaking container. With long chain lengths, the mass of the free chain above the hook load may also cause an altering affecting factor on the total mass being lifted.

By means of the above-described example embodiments, it is thus possible to avoid resonance without requiring more apparatuses for return coupling. Additionally, the speed may be altered sufficiently quickly in order to be able to avoid resonance effectively. By decreasing the vibrating dynamic force, it is possible to increase the life of the chain hoist and to avoid the dropping of the load being lifted. Furthermore, the overhead structures, in which the chain hoist is attached, are less loaded. It should be noticed that the chain hoist may be replaced with a new one quite easily, but the overhead structures are more demanding to repair or reinforce if they are damaged.

It is also obvious to those skilled in the art that, even though some example embodiments were described above, the invention may be implemented in various ways and the invention is not thus restricted to the examples of embodiments described above.

The invention claimed is:

1. An apparatus which comprises:

means for measuring a signal which describes a force caused by the load to the chain;

means for performing high-pass filtering to the signal and for determining a maximum and minimum force affecting the chain of the chain hoist during a vibration period, and determining the start of resonance based on the maximum and the minimum;

means for detecting the start of resonance when a load is moved by a chain hoist;

means for determining a new speed for the rotation of a chain wheel of the chain hoist such that resonance is avoided, wherein the new speed is determined by adding a correction term to a speed instruction, and the speed instruction determines a speed on which the chain wheel is rotated by means of a motor; and means for controlling the chain hoist to use the new speed.

2. An apparatus according to claim 1, wherein resonance is determined as having started when the difference of the maximum and the minimum of the vibration period exceeds a predetermined limit value.

3. An apparatus according to claim 1, wherein the new speed is determined such that a speed is decelerated if the chain hoist is run upwards and the speed is accelerated if the chain hoist is run downwards.

4. A chain hoist which comprising an apparatus according to claim 1.

5. A hoist, which is an overhead travelling crane, a light hoisting system or a swinging boom crane and which comprises a chain hoist according to claim 4.

6. A method comprising:

measuring a signal which describes a force caused by the load to the chain; performing high-pass filtering to the signal and for determining a maximum and minimum force affecting the chain of the chain hoist during a vibration period, and determining the start of resonance based on the maximum and the minimum;

determining the start of resonance when a load is moved by a chain hoist; determining a new speed for the rotation of a chain wheel of the chain hoist such that resonance is avoided, wherein the new speed is determined by adding a correction term to a speed instruction, and the speed instruction determines a speed on which the chain wheel is rotated by means of a motor; and controlling the chain hoist to use the new speed.

7. A method according to claim 6, wherein resonance is determined as having started when the difference of the maximum and the minimum in the vibration period exceeds a predetermined limit value.

8. A method according to claim 6, wherein the new speed is determined such that a speed is decelerated if the chain hoist is run upwards and the speed is accelerated if the chain hoist is run downwards.

9. A method according to claim 6, wherein the method is implemented continuously during the lifting or the lowering of the chain hoist.

* * * * *